July 4, 1933.                M. MORRISON                1,916,383
                      STEREOSCOPIC PLATE SHIFTER
                  Filed Sept. 3, 1931        4 Sheets-Sheet 1

INVENTOR
MONTFORD MORRISON
BY *M. F. C. Pages*
ATTORNEY

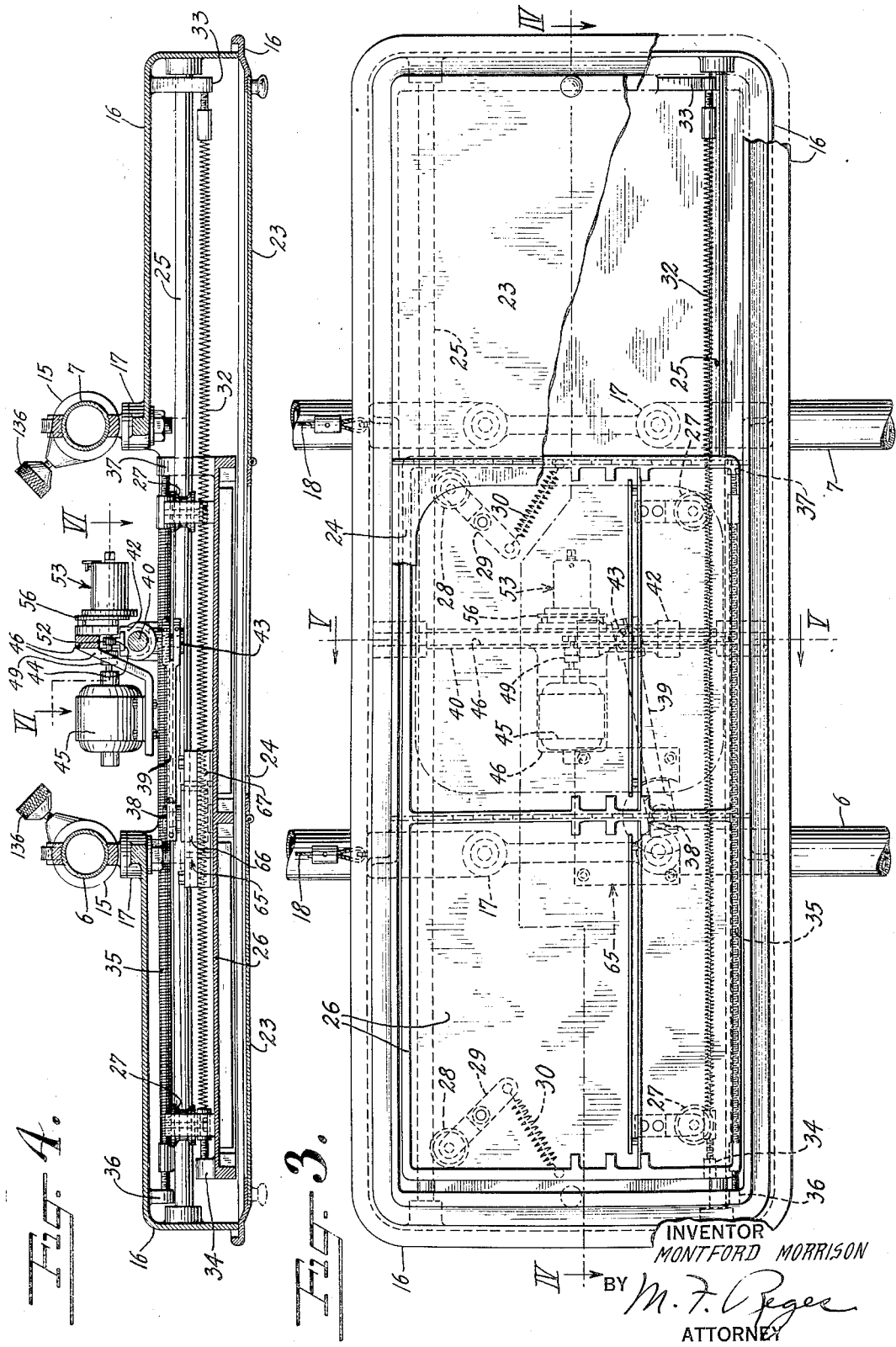

July 4, 1933. M. MORRISON 1,916,383
STEREOSCOPIC PLATE SHIFTER
Filed Sept. 3, 1931 4 Sheets-Sheet 3
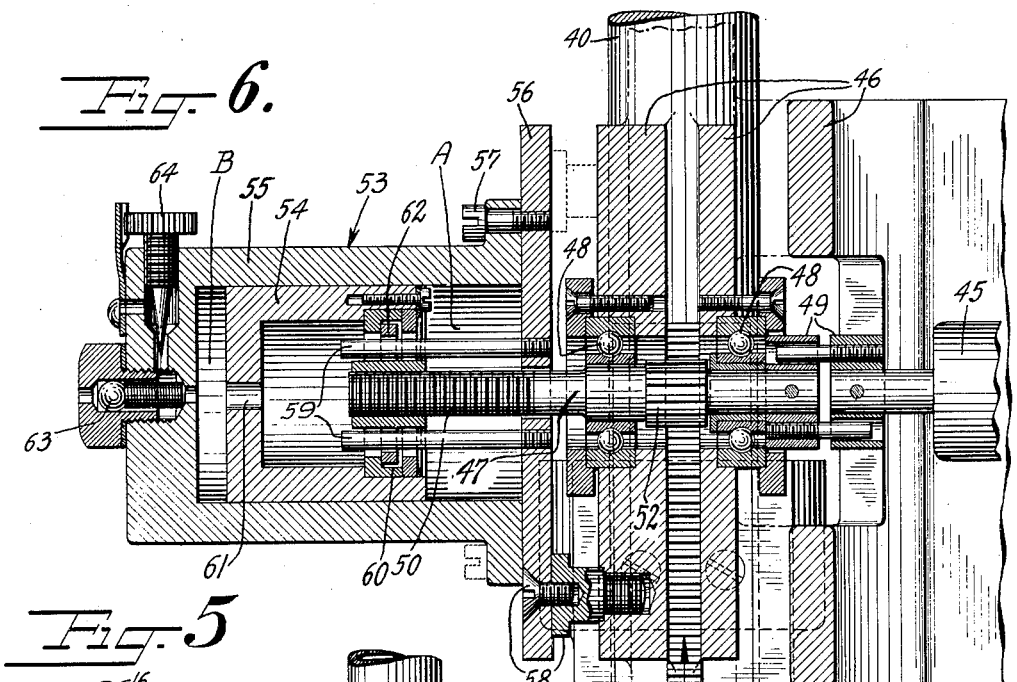
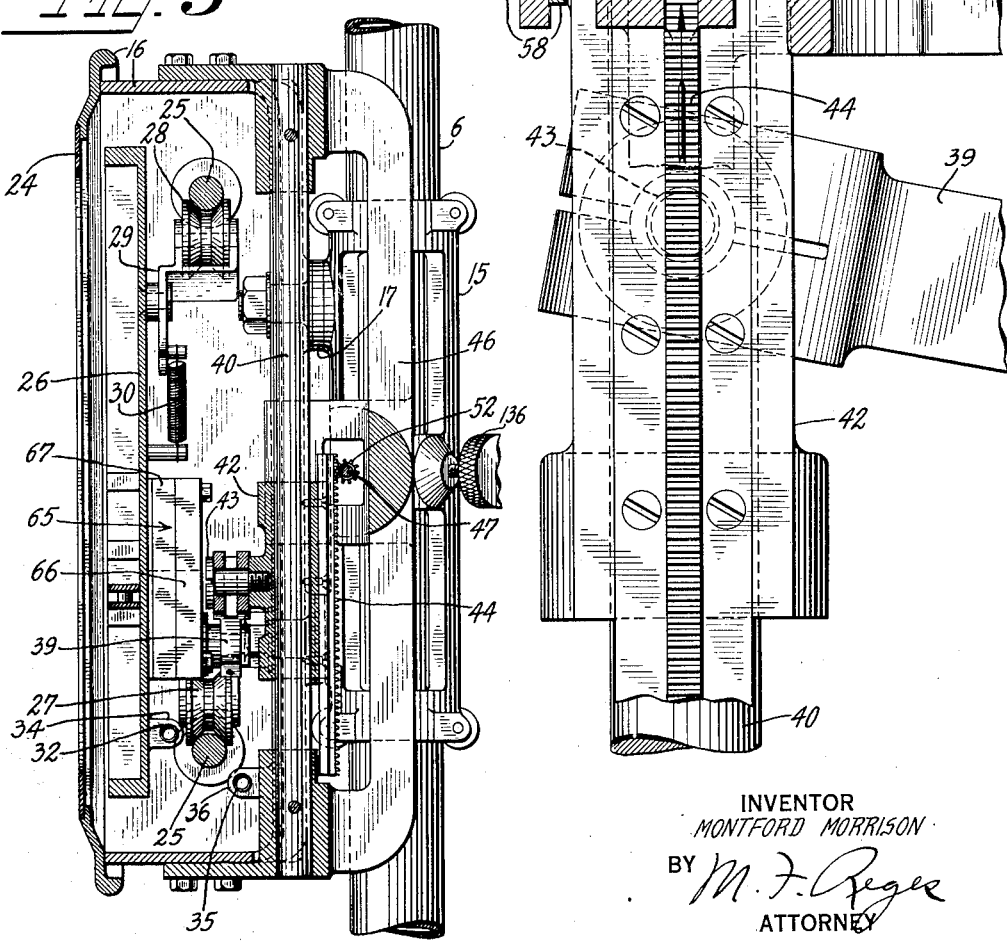
INVENTOR
MONTFORD MORRISON
BY
ATTORNEY July 4, 1933.  M. MORRISON  1,916,383
STEREOSCOPIC PLATE SHIFTER
Filed Sept. 3, 1931  4 Sheets-Sheet 4
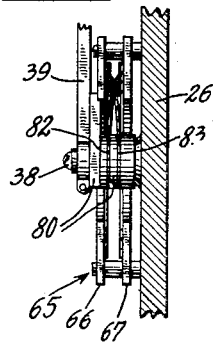
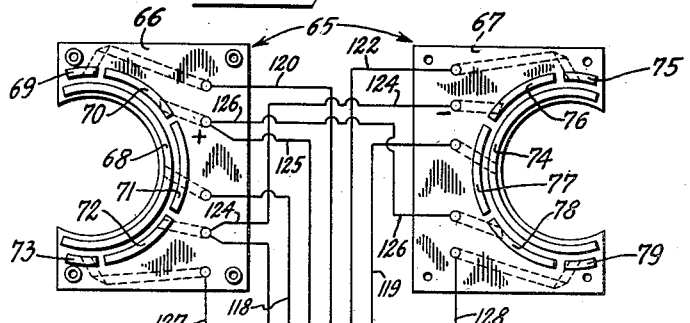
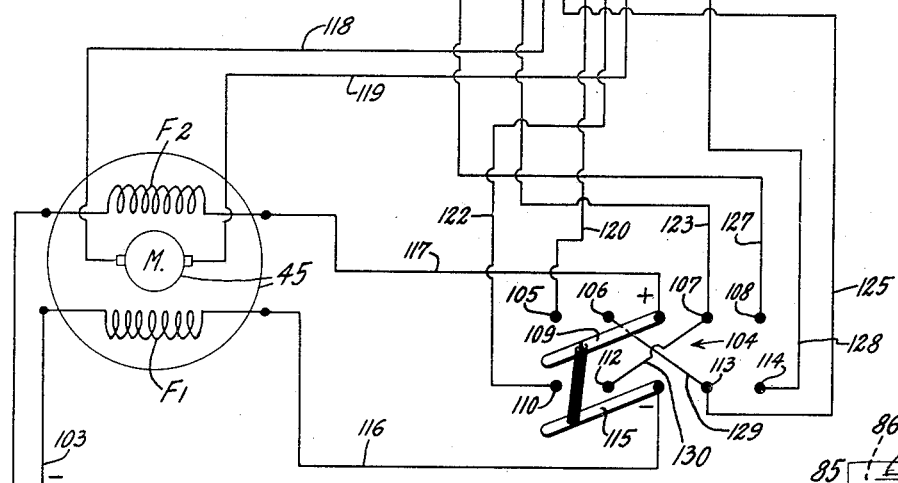
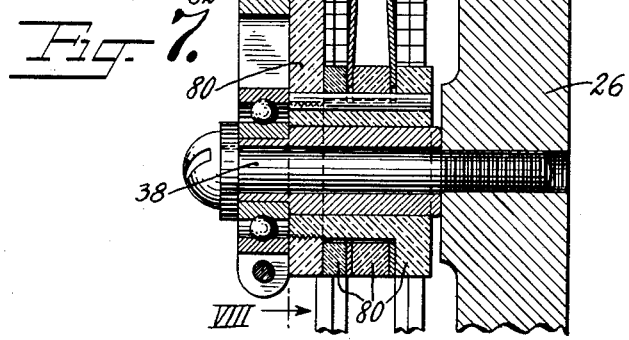
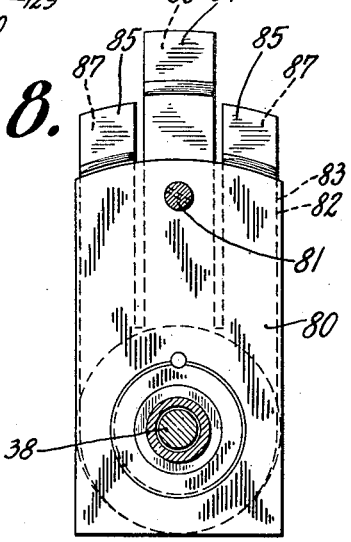
INVENTOR
MONTFORD MORRISON
BY
ATTORNEY Patented July 4, 1933

1,916,383

UNITED STATES PATENT OFFICE

MONTFORD MORRISON, OF MONTCLAIR, NEW JERSEY, ASSIGNOR TO WESTINGHOUSE X-RAY COMPANY, INC., A CORPORATION OF DELAWARE

STEREOSCOPIC PLATE SHIFTER

Application filed September 3, 1931. Serial No. 560,933.

My invention relates to plate changers and particularly to the type commonly utilized with an X-ray tube for taking successive radiographic pictures of an object from two distinct angles.

In apparatus of this general type it is customary to employ a series of plates carrying a plurality of films which are automatically shifted after each exposure simultaneously with the movement of the X-ray tube in order that the resulting pictures being taken from different angles may be viewed stereoscopically through a pair of mirrors thus making the pictures stand out in relief. It is imperative that the film to be exposed properly aligns with the object to be radiographed and the X-ray tube and that the exposed film be properly shielded from the X-rays to prevent a double exposure. For this reason in shifting the films from one position to the other it must be done as expeditiously as possible and with a total absence of any vibratory movement after completion of the shift.

It is, therefore, an object of my invention to provide a plate changer which may be utilized with an X-ray tube for exposing a plurality of sensitized films to produce a stereoscopic effect.

Another object of my invention is the provision of a plate changer for shifting a plurality of sensitized films to successively position the same for exposure to X-rays.

Another object of my invention is the provision of a plate changer for automatically shifting a series of sensitized plates in position with an object to be radiographed.

Another object of my invention is the provision of a plate changer which performs a plurality of operations in the proper sequence and at predetermined periods of time.

A further object of my invention is the provision of a plate changer for successively positioning a series of sensitized films in which the operation is entirely automatic after initial operation by an operator and in which there is an absolute absence of vibratory motion of the device upon completion of the shift.

Still further objects of my invention will become apparent to those skilled in the art by reference to the accompanying drawings wherein:

Figure 1 is a front elevational view of my plate changer with a portion thereof broken away to better illustrate the device;

Figure 2 is a side elevational view of the device;

Figure 3 is a front elevational view on an enlarged scale of a portion of my plate changer;

Figure 4 is a sectional view taken on the line IV—IV of Fig. 3;

Figure 5 is a sectional view taken on the line V—V of Fig. 3;

Figure 6 is a sectional view taken on the line VI—VI of Fig. 4 on an enlarged scale showing the details of the brake mechanism of my device.

Figure 7 is a detailed sectional view on an enlarged scale of the reversing switch I employ with my plate changer;

Figure 8 is a detailed view of the contact finger of my reversing switch taken on line VIII—VIII of Fig. 7;

Figure 9 is an end view of my reversing switch, when assembled, and

Figure 10 is a diagrammatical view of the circuit utilized with my plate changer.

Referring now to the drawings in detail I have shown in Fig. 1 a base member 5 upon which are mounted a pair of uprights 6 and 7. A yoke 8 rigidly supports these uprights at their upper extremity and a pair of angular braces or tie rods 9 and 10 assist in maintaining the uprights 6 and 7 in a rigid vertical position. A pair of angularly extending uprights 12 and 13 are disposed between the yoke 8 and base 5 and act as guide rails for a counterweight 14.

Each of the vertical uprights 6 and 7 are provided with loosely fitting sleeves or collars 15 which are arranged to be moved vertically of these uprights. A horizontally disposed casing 16 is rigidly supported to these collars 15 by means of studs 17 and a pair of chains or cables 18 are secured to the casing 16 and pass over a pair of pulleys 19 to the counterweight 14. A hand wheel 20 is secured to a shaft 22 upon which the pulleys 19 are secured for the purpose of adjusting the counter-balanced casing vertically of the uprights 6 and 7.

The casing 16 is of a sufficient depth to house the plate changing mechanism now about to be described and is provided with a pair of hinged doors 23 exactly alike as can be appreciated from Fig. 4. These doors are made of, or lined with, a material impervious to X-rays such as lead and together constitute approximately two thirds of the total width of this casing. The remaining one third is a section 24 disposed between these two door sections and is pervious to X-rays.

A pair of rods 25 extend horizontally of the interior of the casing 16 and a cassette or film holding carriage 26 having a width approximating that of two thirds the casing 16 is arranged to be moved longitudinally of these rods and carry a plurality of sensitized films. This carriage is provided with a pair of fixed rollers 27 which engage the lowermost rod 25 and a pair of rollers 28 which engage the upper rod 25. These latter rollers 28 are carried by pivoted arms 29 affixed to the carriage and are caused to engage the upper rod 25 by the pressure exerted by a pair of springs 30. This construction allows the ready removal of the carriage 26 from the casing 16.

A coil spring 32 is secured at 33 to the right hand end of the casing 16 and to the back of the lower left hand corner 34 of the carriage 26 as viewed from Figs. 1, 3 and 4. A similar coil spring 35 is secured at the left hand corner 36 of the casing and to the lower right hand corner 37 of the carriage. The tension of the respective springs 32 and 35 thus oppose each other and tend to equalize when the carriage 26 is centrally disposed relative to the casing 16.

A rearwardly extending pin 38 is secured to the back of the carriage 26 at approximately the center of the width thereof and a crankshaft or link 39 is journaled to rotate about this pin 38. A vertically extending rod 40 is centrally disposed relative to the casing 16 and is rigidly secured thereto.

A loose collar 42 surrounds this rod 40 and is provided with a laterally extending pin 43 to which the other end of the crankshaft 39 is rotatably secured. In order to move this latter collar 42 vertically of the rod 40 and thus cause the crankshaft 39 to move the carriage 26 horizontally upon the rods 25 I provide the collar 42 with a segmental rack 44 (see Figs. 5 and 6).

An electric motor 45 is rigidly supported upon a bracket 46 in the rear of the casing 16 and a horizontal shaft 47 is journaled in suitable bearings, such as ball bearings 48 (Fig. 6). The shaft 47 extends each side of the bearings 48 and is connected at one end to the shaft of motor 45 by means of a suitable coupling 49 while its other end is provided with a threaded portion 50 for a purpose to be hereinafter described.

A pinion gear 52 is rigidly secured to the shaft 47 and is positioned to engage the segmental rack 44. In this manner rotation of the motor 45 causes the collar 42 to move up and down upon the rod 40 and move the carriage 26 back and forth relative to the casing 16. This movement of the carriage places one or the other of the respective springs 32 or 35 under tension depending upon the direction of movement thereof and the purpose of these springs and their cooperation in the movement will be more fully hereinafter described.

In order to bring the carriage 26 to rest in position to permit one or the other portions of the same, carrying the sensitized films, to register with the pervious sections 24 of the casing 16 with a total absence of any vibratory motion I provide a brake 53 which may be understood by reference to Fig. 6.

The threaded portion 50 of the shaft 47 engages a double headed piston 54 which is arranged to move back and forth in a cylinder 55. This cylinder is secured to a face plate 56, by any suitable means such as screws 57, and the face plate is in turn secured to the supporting bracket 46 carrying the motor 45, by suitable means such as screws 58.

The shaft 47 extends loosely through the face plate 56 to allow the exhausting of air therebetween and a pair of guide pins or studs 59 secured to the face plate extend loosely through one head of the piston 54 to prevent rotation of the same when the shaft 47 is rotated. In this manner upon rotation of the shaft 47 the piston will not rotate therewith but will be moved longitudinally of the shaft 47 and cylinder 55 upon the guide pins 59.

The head of the piston 54 through which the threaded portion 50 of the shaft 47 passes, is provided with an annular groove 60 and a sealing ring 62 is disposed therein which has a cross sectional area slightly less than the groove 60. The purpose of this ring is to prevent any appreciable amount of air that is compressed in the chamber A by movement of the piston to the right, as viewed from Fig. 6, from entering the chamber B through a hole 61 in the head of the piston 54. There will, however, be some air forced into the hollow portion of the piston due to the looseness of the guide pins 59 but this amount will be small and of infinitesimal consequence as the greater portion will be exhausted through the loose opening provided between the shaft 47 and face plate 56.

The cylinder 55 is provided with a suitable spring pressed ball check 63 to allow for the intake of air during movement of the piston in one direction and an adjustable needle valve 64 is provided to allow exhausting of the air during the reverse movement of the piston by the remaining piston head. This piston acts as a combination brake and shock absorber to prevent any vibratory action of the carriage 26 when the latter has reached its limit of travel in either direction and causes the films to remain fixed in alignment with the previous section of the casing 16.

The motor 45 initiates the movement of the carriage 26 to compensate for the inertia required to start this movement and one of the respective springs 32 or 35, depending upon which is under tension, assists the action of the motor. When the carriage has moved a sufficient distance to permit the pin 38 to pass to the right of the rod 40 the motor is automatically shut off by means of a switch mechanism 65 now about to be described. The energy of one of the respective springs 32 or 35 is then sufficient to continue the movement of the carriage 26 until the motor is finally deenergized and the aforementioned brake mechanism 53 stops the carriage at the proper location.

Referring now more particularly to Figs. 7, 8, 9 and 10 I have shown a switch together with a plurality of circuits which I utilize with my plate changer for operating the electric motor 45. A pair of segmental blocks of insulating material 66 and 67 are secured to the back of the carriage 26 and positioned adjacent the pin 38 and crankshaft 39.

The insulated block 66 is provided with a series of arcuate metallic strips 68, 69, 70, 71, 72 and 73 which may be better understood by reference to Fig. 10 wherein the insulated blocks 66, 67 have been positioned 180° from each other for the sake of clarity whereas in their normal operating position they are in a parallel position as shown in Figs. 1, 3, 7 and 9.

The insulated block 67 is likewise provided with a similar number of arcuate metallic strips 74, 75, 76, 77, 78 and 79. In order to establish contact between these various metallic strips to complete the circuits to the motor 45 I provide an insulated block 80 which is journaled upon the pin 38 and secured to the front of the crankshaft 39 by means of a pin or set screw 81. This block 80 is provided with a pair of contact strips 82 and 83 each of which are provided with a plurality of contact fingers 84, 85 and 86, 87 respectively.

When the block 80 rotates with the crankshaft 39 about the pin 38 the contact finger 84 makes contact successively with the arcuate strips 69, 70, 71, 72 and 73, while the contact finger 85 maintains contact with the elongated strips 68. In a like manner during rotation of the block 80 the contact finger 86 makes successive contact with the respective strips 75, 76, 77, 78 and 79, while the finger 87 maintains a constant connection with the other elongated strip 74. It thus becomes obvious that during movement of the carriage 26 in either direction the switch, represented generally at 65, is caused to successively open and close a plurality of circuits by the movement thereof by the crankshaft 39 which likewise operates to move the carriage.

Referring now to Fig. 10 I have shown a diagrammatical representation of various circuits which I utilize for operating my plate changer. A suitable source of electrical energy, such as a generator 100, is arranged to supply electrical energy to the electric motor by means of a pair of supply mains 102 and 103 which are connected to one end of the field windings F1 and F2 of motor 45. A double pole double throw control switch, represented generally at 104, is positioned in a convenient location and is provided with a series of contact terminals 105, 106, 107, 108 which in operation are adapted to be engaged by one of the switch blades 109 and another set of contact terminals 110, 112, 113, and 114 adapted to be contacted during operation by the remaining switch blade 115.

A conductor 116 extends from the remaining end of the field winding F1 to the switch blade 115 and a similar conductor 117 connects the remaining end of the field winding F2 to the other switch blade 109. A conductor 118 extends from one terminal of the armature of motor 45 to the arcuate metallic strip 68 carried by the insulated block 66 and another conductor 119 extends from the remaining armature terminal to the strip 74 carried by the block 67. A conductor 120 connects the terminal 105 of the control switch 104 to the strip 69, carried by block 66, and a conductor 122 connects the switch terminal 110 to the strip 75 of block 67.

A conductor 123 connects the terminal 107 of the switch 104 to strip 72 carried by block 66, and a conductor 124 interconnects strip 72 with the strip 76 carried by the block 67.

The switch terminal 113 is connected by means of a conductor 125 to the strip 70 of block 66 and a conductor 126 interconnects this latter strip with strip 78 of block 67. Likewise a conductor 127 connects the switch terminal 108 with the strip 73 of block 66 and a conductor 128 connects the switch terminal 114 with strip 79 of block 67. Switch terminal 106 is bridged with terminal 113 by means of a conductor 129 and the switch terminal 107 is likewise interconnected by means of a conductor 130 with terminal 112 for reversing the direction of movement of carriage 26 as hereinafter explained.

Assuming now it is desired to take a radiographic exposure of an object my plate changes is leveled upon the floor by suitable means, such as adjusting screws 135 secured to the base 5, and the casing 16 is adjusted vertically upon the standards 6 and 7 by means of the hand wheel 20 until the pervious section 24 is positioned in the rear of that portion of the patient's anatomy which it is desired to radiograph. The casing 16 may be secured in the desired location by means of set screws 136 as shown in Figs. 4 and 5.

The carriage 26 is then loaded with sensitized films through the hinged doors 23 and the same is moved to one or the other of its limits of travel in the casing 16 such as to the left, as shown in Figs. 1, 3 and 4, which permits one of the films to align with the impervious section 24 of the casing. The X-ray tube (not shown) is then energized in a suitable manner and the image registers upon the film.

Upon deenergizing the X-ray tube the hand switch 104 is then closed to the left as viewed in Fig. 10. This causes the switch blade 109 to establish contact with the respective switch terminals 105 and 106 and the switch blade 115 to likewise establish contact with the respective switch terminals 110 and 112.

Assuming the carriage 26 is in the position just mentioned the insulated block 80 affixed to crankshaft 39 will have its contact fingers in contact with the arcuate metallic strips carried by the insulated blocks 66 and 67 in the following manner. Contact finger 84 will establish a connection with strip 69 and finger 85 will establish a connection with the arcuate strip 68 carried by the insulated block 66. In the same manner the contact finger 86 will connect strip 75 and finger 87 will be in connection with the strip 74 of the other insulated block 67.

Upon closure of the aforementioned hand switch 104 the electric motor 45 will immediately become energized through a circuit which may be traced as follows: from the source of energy 100, through the conductor 102, to field winding F2 and thence through conductor 117 to the switch blade 109. At this point the circuit divides a portion thereof extending from the switch terminal 105, conductor 120 to the metallic strip 69, through contact finger 84 to contact finger 85 which is in contact with strip 68, thence through conductor 118 to the armature of motor 45, through conductor 119 to the strip 74 carried by block 67, then through contact fingers 86 and 87 to the strip 75, through conductor 122 to switch terminal 110, through blade 115 and conductor 116 to the field winding F1 and thence back to the source 100 through conductor 103.

The motor 45 will rotate the shaft 47 carrying the pinion gear 52, which engages the rack 44 carried by collar 42, and moves this latter collar vertically upon the rod 40. Movement of the collar 42 rotates the crankshaft 39 about the respective pins 38, 43 and draws the carriage toward the right upon the rods 25. Upon rotation of the crankshaft 39 about the pin 38 the insulated block 80 which is secured thereto by means of the pin 81 will likewise rotate. This causes the respective contact fingers 84 and 86 to pass from the respective metallic strips 69, 75 to the strips 70, 76.

The motor 45, however, continues to run because that portion of the circuit extending from the switch terminals 105 and 110 to the contact strips 69, 75 is reestablished in the following manner: from the switch terminal 106 through conductor 129 to the switch terminal 113, then by means of conductor 125 to the strip 70 and from switch terminal 112 through conductor 130 to the switch terminal 107 and thence by means of conductor 123 and 124 to the strip 76. This reestablishes that portion of the circuit interrupted by rotation of the contact block 80 and as the remainder of the motor circuit as previously traced is undisturbed the motor continues to move the carriage 26 as above mentioned.

Further movement of the carriage 26 toward the right with the accompanying rotation of the crankshaft 39 about the pin 38 likewise causes further rotation of the block 80 with its respective contact fingers 84, 85, 86 and 87. This further rotation of the block 80 moves the contact fingers 84, 86 from the respective strips 70, 76 to the respective strips 71, 77. These latter strips not being supplied with energy from the source are "dead" and consequently the motor circuit is interrupted thereby deenergizing the motor.

Although the motor is now deenergized the carriage 26 will continue its movement in the initial direction due to its momentum and the potential energy of one of the springs 32, 35 which in the operation heretofore assumed would be the spring 32 now under tension. This movement of the carriage will rotate the block 80 still further until the contact fingers 84 and 86 engage the respective strips 72 and 78. These latter strips are connected by means of conductors 124 and 126 to the strips 76 and 70 respectively which again completes a circuit to the motor 45 in the same manner as previously traced with one exception, however, which is that the direction of flow of the energy through the armature of the motor is reversed thereby reversing the direction of rotation of the motor.

This reversal of the motor may be appreciated by noting that the armature of the motor is connected to the respective strips 68 and 74 and when the strip 68 is energized through the contact fingers 84 and 85 from the strip 70 it receives current of one polarity which may be assumed to be positive current. Likewise when the strip 74 is energized through the contact fingers 86, 87 from the strip 76 it receives current of an opposite polarity or negative current.

In providing the conductors 124 and 126 which, as before explained, interconnect the respective strips 76, 72 and 70, 78, current of an opposite polarity is thus caused to flow to the respective strips 68, 74 and to the armature from that which flowed during the former energization of the motor.

The motor 45 will, therefore, be again energized but rotates in an opposite direction to force the collar 42 in a downward direction. This movement, however, continues to force the carriage 26 in its initial direction as the pin 38 will at this time have passed to the right of the rod 40 a sufficient distance to enable the thrust of the crankshaft 39 to be in the same direction and it will continue to rotate in the same direction. Further rotation of the crankshaft 39 also rotates the block 80 until the contact fingers 84 and 86 establish a connection with the strips 73 and 79 respectively. These latter strips, being connected by means of the conductors 127 and 128 to the respective switch terminals 108 and 114, are now "dead" as the switch blades 109 and 115 are not in contact therewith and consequently the circuit to the motor 45 is again interrupted.

The carriage 26 has, however, now reached its extreme limit of travel in this direction and the sensitized film which was formerly disposed in back of the left hand impervious section 23 (Figs. 1, 3 and 4), is now aligned with the pervious section 24 and the exposed film is positioned in back of the right hand impervious section 23. The X-ray tube may, therefore, be shifted to a different angle relative to the object and again energized in any suitable manner to expose the patient to another radiographic picture in order to study the resulting pictures in a stereoscopic device.

During the rotation of the shaft 47 by the motor 45 the double headed piston 54 is moved longitudinally of the cylinder 55 upon the guide pins 59 by the engagement of the piston with the threaded portion 50 of the shaft.

The air contained in chamber A of the cylinder 55 ahead of the piston is thus slowly forced out through the loose opening between the shaft 47 and face plate 56 and air is slowly drawn into the chamber B through valves 63. When the piston is moved in the opposite direction air is forced out of chamber B through the needle valve 64 and is drawn into chamber A through the same opening as that through which exhaust follows movement of the piston in the other direction of movement. As the piston moves in either direction of movement the sealing ring 62 will be forced into a direction opposite to that of the movement of the piston thereby substantially closing the gap 60. The slight leakage of air around the pins 59 is allowed to pass into the opposite chamber through the opening 61 to assist in absorbing the shock.

The entire mechanism comprising the motor 45, collar 42, crankshaft 39 and carriage 26 is therefore brought to a gradual position of rest with an entire absence of vibratory movement when the motor 45 is deenergized. The mechanism is likewise maintained in the desired location through the medium of the brake 53 together with the mechanical connection of the pinion gear 52 and rack 44.

When it is desired to cause the carriage to move in a direction opposite to that previously assumed, that is to say from right to left, the hand switch is moved to the right as viewed from Fig. 10. This enables the switch blade 109 to establish a contact with the terminals 107 and 108, and the blade 115 to contact the terminals 113, 114 to again cause the motor 45 to become energized through the conductors 127 and 128.

In this position of the switch the strips 73 and 79 receive energy and the remainder of the circuit to the motor is completed in the same manner as previously described. During the rotation of the crankshaft 39 carrying the block 80 in the opposite direction the identical cycle of operations follow as was described during movement of the carriage 26 from left to right.

It must be appreciated that the length of the arcuate metallic strips 69, 70, 71, 72, 73 carried by the insulated block 66 and the similar strips 75, 76, 77, 78 and 79 carried by the block 67 are so apportioned relative to the speed of motor 45 and the length of travel of the carriage 26 that the aforementioned sequence of operation takes place at predetermined time intervals. Likewise it must be understood that this sequence of operations follow each other in rapid succession and that the entire period of time required to shift the carriage 26 within the casing 16 is of relatively short duration.

It can thus be readily seen by those skilled in the art that I have provided a radiographic plate changer for exposing a plurality of sensitized films in rapid succession to a suitable source of X-rays and in which the shifting of the plate is accomplished with accuracy in properly aligning the films with the pervious and impervious sections of the casing and with an entire absence of vibratory motion when the carriage is brought to a position of rest.

Although I have shown and described one specific embodiment of my invention I do not desire to be limted thereto as various other modifications of the same may be made without departing from the spirit and scope of the appended claims.

What is claimed is:

1. In a radiographic plate changer, a casing, a carriage mounted for reciprocatory movement in a single plane within said casing, an operating member mounted for reciprocatory movement in a plane at right angles to and crossing the plane of movement of said carriage, a crankshaft interconnecting said operating member and said carriage, and means for moving said operating member to impart reciprocatory movement to said carriage.

2. In a radiographic plate changer a casing, a carriage mounted for reciprocatory movement in a single plane within said casing, an operating member mounted for reciprocatory movement in a plane at right angles to and crossing the plane of movement of said carriage, a crankshaft interconnecting said operating member and said carriage, means connected to said operating member to impart reciprocatory movement thereto and to said carriage through said crankshaft, and means operable upon movement of said carriage for reversing the movement of said first mentioned means and said operating member after said carriage has moved a predetermined distance.

3. In a radiographic plate changer, a carriage mounted for reciprocatory movement in a single plane, an operating member mounted for reciprocatory movement in a plane at right angles to and crossing the plane of movement of said carriage, a crankshaft interconnecting said operating member and said carriage, means for moving said operating member to impart reciprocatory movement thereto and to said carriage, and means carried upon said carriage and operable by the simultaneous movement of said crankshaft and carriage for reversing the movement of said first mentioned means and said operating member when the greater portion of said carriage has crossed the plane of movement of said operating member.

4. In a radiographic plate changer, a carriage mounted to move in a single plane upon guide rods, an operating member provided with a gear rack arranged to be moved in a single plane upon a guide rod at right angles to the plane of movement of said carriage, a crankshaft interconnecting said operating member and said carriage, and an electric motor provided with a pinion gear engaging said gear rack for causing said operating member to move upon its guide rod and to move said carriage upon its respective guide rods when said motor is energized and rotates said pinion gear.

5. In a radiographic plate changer, a carriage mounted to move in a single plane upon guide rods, an operating member provided with a gear rack arranged to be moved in a single plane upon a guide rod at right angles to the plane of movement of said carriage, a crankshaft interconnecting said operating member and said carriage, an electric motor provided with a pinion gear engaging said gear rack for causing said operating member to move upon its guide rod and to move said carriage upon its respective guide rods, and an electric switch mechanically connected to said crankshaft and electrically connected to said motor for controlling said motor by the movement of said carriage.

6. In a radiographic plate changer, a carriage mounted to move in a single plane upon guide rods, an operating member provided with a gear rack arranged to be moved in a single plane upon a guide rod at right angles to the plane of movement of said carriage, a crankshaft interconnecting said operating member and said carriage, an electric motor provided with a pinion gear engaging said gear rack for causing said operating member to move upon its guide rod and to move said carriage upon its respective guide rods, and a brake mounted upon the shaft of said motor for arresting the movement of said operating member and said carriage.

7. In a radiographic plate changer, a frame member, a carriage mounted for reciprocatory movement in a single plane upon guide rods in said frame member, an operating member mounted for reciprocatory movement in a single plane upon a guide rod at right angles to the movement of said carriage, a crankshaft interconnecting said operating member and said carriage, an electric motor connected to said operating member for initiating movement of said operating member and said carriage upon their respective guide rods, and a spring connected to said carriage and to said frame member for continuing the movement of said carriage after initial movement by said motor.

8. A radiographic plate changer comprising a casing provided with sections pervious and impervious to X-rays, a carriage adapted to hold a plurality of sensitized films and arranged for reciprocatory movement disposed in said casing with a portion of said films in alignment with the pervious section and the remainder thereof in alignment with the impervious section of said casing, an operating member arranged for reciprocatory movement at right angles to the movement of said carriage, means connected to said operating member for causing reciprocatory movement thereof, means interconnecting said operating member and said carriage for transmitting reciprocatory movement to the latter upon movement of said operating member to alter the position of said films relative to said sections, and means associated with said carriage and operable upon movement thereof for reversing the direction of said first mentioned means and said operating member after said carriage has moved a predetermined distance.

9. A radiographic plate changer comprising a casing provided with a section pervious to X-rays and a plurality of sections impervious to X-rays, a carriage adapted to hold a plurality of sensitized films and arranged for reciprocatory movement disposed in said casing with a portion of said films in alignment with the pervious section and the remainder thereof in alignment with one of the impervious sections of said casing, an operating member carried by said casing and arranged for reciprocatory movement at right angles to the movement of said carriage, means connected to said operating member for causing reciprocatory movement thereof, means interconnecting said operating member and said carriage for transmitting reciprocatory movement to the latter upon movement of said operating member to alter the position of said films relative to said sections, and means associated with said carriage and operable upon movement thereof for reversing the direction of said first mentioned means and said operating member after said carriage has moved to align one of said films with the remaining impervious section of said casing after exposure thereof to X-rays and the remaining film with the pervious section of said casing.

10. A radiographic plate changer comprising a casing provided with a section pervious to X-rays and a plurality of sections impervious to X-rays, a carriage adapted to hold a plurality of sensitized films and arranged for reciprocatory movement disposed in said casing with a portion of said films in alignment with the pervious section and the remainder thereof in alignment with one of the impervious sections of said casing, an operating member carried by said casing and arranged for reciprocatory movement at right angles to the movement of said carriage, means connected to said operating member for causing reciprocatory movement thereof, means interconnecting said operating member and said carriage for transmitting reciprocatory movement to the latter upon movement of said operating member to alter the position of said film relative to said sections, means associated with said carriage and operable upon movement thereof for reversing the direction of said first mentioned means and said operating member and rendering the same ineffective to cause movement of said operating member after said carriage has moved to align one of said films with the remaining impervious section of said casing after exposure thereof to X-rays and the remaining film with the pervious section of said casing, and means associated with said first mentioned means for arresting the movement of said operating member and carriage after the latter has moved a predetermined distance in either directions of travel.

11. In a positively driven radiographic plate changer the combination of, a casing provided with a carriage mounted for reciprocatory movement in a longitudinal plane relative to said casing, an operating member mounted for reciprocatory movement in a plane at right angles to and crossing the plane of movement of said carriage, means connected to said operating member for causing reciprocatory movement thereof, and means interconnecting said operating member and said carriage whereby said first mentioned means imparts simultaneous reciprocatory movement to said operating member and said carriage.

12. In a positively driven radiographic plate changer the combination of, a casing provided with a carriage mounted for reciprocatory movement in a longitudinal plane relative to said casing, an operating member mounted for reciprocatory movement in a plane at right angles to and crossing the plane of movement of said carriage, means connected to said operating member for causing reciprocatory movement thereof, means interconnecting said operating member and said carriage whereby said first mentioned means imparts simultaneous reciprocatory movement to said operating member and said carriage, and means operable upon the simultaneous movement of said operating member and said carriage for reversing the movement of said first mentioned means and said operating member after said carriage has moved a predetermined distance.

13. In a positively driven radiographic plate changer the combination of, a casing provided with a carriage mounted for reciprocatory movement in a longitudinal plane relative to said casing, an operating member mounted for reciprocatory movement in a plane at right angles to and crossing the plane of movement of said carriage, means connected to said operating member for moving the same in a predetermined path, means interconnecting said operating member and said carriage for transmitting reciprocatory movement from said operating member to said carriage, means operable upon the simultaneous movement of said operating member and said carriage for reversing the movement of said first mentioned means after said operating member has moved a predetermined distance in its path of travel and for rendering said first mentioned means ineffective to cause movement of said operating member and said carriage after the greater portion of said carriage has crossed the plane of movement of said operating member, and energy storage means connected to said carriage for continuing the movement thereof to its extremity of travel after said last mentioned means has rendered said first mentioned means ineffective to cause further movement of said carriage.

In testimony whereof, I have hereunto subscribed my name this 1st day of September, 1931. MONTFORD MORRISON.